United States Patent
Oyama

[19]

[11] Patent Number: 5,904,335
[45] Date of Patent: May 18, 1999

[54] FLOW CONTROL VALVE WITH A PRESSURE COMPENSATION FUNCTION

[75] Inventor: Hitoshi Oyama, Itami, Japan

[73] Assignee: Sumitomo Electric Industries, Ltd., Osaka, Japan

[21] Appl. No.: 09/064,311

[22] Filed: Apr. 23, 1998

[30] Foreign Application Priority Data

Apr. 28, 1997 [JP] Japan .................................. 9-110919

[51] Int. Cl.$^6$ .................................................. F16K 31/02
[52] U.S. Cl. ............... 251/129.07; 251/282; 137/614.11; 303/119.2
[58] Field of Search ................... 251/129.07, 129.15, 251/129.08, 282; 303/119.2; 137/614.11, 614.12

[56] References Cited

U.S. PATENT DOCUMENTS

| | | | |
|---|---|---|---|
| 5,018,797 | 5/1991 | Takata | 251/129.15 |
| 5,109,886 | 5/1992 | Takata et al. | 303/119.2 |
| 5,431,489 | 7/1995 | Lee | 303/119.2 |
| 5,472,266 | 12/1995 | Volz et al. | 303/119.2 |
| 5,607,137 | 3/1997 | Kanda et al. | 251/129.07 |
| 5,678,902 | 10/1997 | Farr et al. | 303/119.2 |

FOREIGN PATENT DOCUMENTS

| | | |
|---|---|---|
| 3-90462 | 4/1991 | Japan . |
| 32235787 | 10/1991 | Japan . |
| 6-83457 | 3/1994 | Japan . |

OTHER PUBLICATIONS

A Japanese Abstract of JP 3–90462.
A Japanese Abstract of JP 3–223578.
A Japanese Abstract of JP 6–83457.

*Primary Examiner*—Denise L. Ferensic
*Assistant Examiner*—John Ball
*Attorney, Agent, or Firm*—Greenblum & Bernstein, P.L.C.

[57] ABSTRACT

A flow control valve having a pressure compensation function. This valve is free of fluid leakage and needs no pressure sensor. This valve includes a housing having a first port and a second port, a piston axially slidably mounted in the housing, a valve body formed at one end of the piston, a first fluid chamber defined between the other end of the piston and the housing, a second fluid chamber defined between the valve body and the housing, a variable-area orifice formed on the outer periphery of the piston and adapted to close when the piston is at a predetermined axial position, thereby shutting off the first fluid chamber and the first port from each other, a connecting path formed in the piston to communicate with the variable-area orifice and connecting the first fluid chamber with the second fluid chamber through a fixed-area orifice, an on-off valve comprising the valve body and a valve seat, a biasing means biasing the on-off valve at all times in a direction to open the on-off valve, and an electromagnetic biasing means for controlling the movement of the piston toward the biasing means.

3 Claims, 9 Drawing Sheets

FLOW CONTROL VALVE WITH A PRESSURE COMPENSATION FUNCTION

BACKGROUND OF THE INVENTION

The present invention relates to a fluid flow control valve for controlling the fluid pressure rising and lowering speed (flow rate to be exact), particularly a flow control valve suited for use in a fluid pressure control device such as an antilock brake control system and capable of continuously controlling the fluid flow when the valve is open and preventing the leakage of hydraulic fluid when the valve is deactivated, i.e. closed.

Antilock brake systems include, practically without exception, an electromagnetic valve as a fluid pressure control means. Even if the time period during which a pressure reduction or increase command is maintained is constant, the degree of pressure reduction or increase (that is, the flow rate at which hydraulic fluid flows through the valve) varies with the voltage applied, temperature, input fluid pressure, output fluid pressure, etc. But electromagnetic valves cannot detect and feed back the rate of fluid flow through the valves. Without information on variations in fluid flow through the valve, it is impossible to control the hydraulic pressure with high accuracy by correcting the fluid flow.

A sensor provided in the fluid pressure line would serve this purpose. But providing a separator sensor is an uneconomical solution. Another solution would be to reduce the degree of pressure reduction and pressure increase on each command for finer, more delicate pressure control. But this solution has a problem in that the smaller the degree of pressure increase or reduction on each command, the greater the possibility that the pressure may not rise or lower at all on such command due to variations in the fluid flow through the valve.

Thus, conventional brake fluid pressure control valves have still room for improvement in their ability to carry out pressure increase and reduction commands with high accuracy and quickness.

To solve this problem, unexamined Japanese patent publication 3-90462 proposes a flow control valve 100 shown in FIG. 8. This valve has a piston 102 slidably mounted in a housing 101 to define a first fluid chamber A and a second fluid chamber B between the piston 102 and both ends of the housing 101. The piston 102 is formed with an axial fluid passage 102B including a fixed-area orifice 102A. The passage 102B communicates with an annular groove 102C formed in the outer periphery of the piston.

The piston 102 is biased axially by a spring 103 and an electromagnet 104. The housing 101 has an input port 101A communicating with the fluid passage 102B through the annular groove 102C, and an output port 101B communicating with the second fluid chamber B. This valve further includes a discharge port provided between the annular groove 102C and the second fluid chamber B. But this discharge port is not described any further because it is not necessary for understanding of the present invention.

The fluid flow rate through the orifice 102A is determined by the difference between the pressures at both ends of the orifice 102A, which communicate with the first and second fluid chambers A and B, respectively. This pressure difference is in turn determined by the biasing forces applied to the piston 102 from the spring 103 and the electromagnet 104, respectively.

An orifice variable in flow area (degree of opening) is defined at the intersection of the input port 101A and the annular groove 102C. The degree of opening of this orifice influences the abovementioned pressure difference. That is, when the piston 102 moves rightwardly and the degree of opening of the variable-area orifice increases, the pressure in the first fluid pressure A rises correspondingly, urging the piston 102 leftwardly. Conversely, when the piston 102 is moved leftwardly biased by the electromagnet 104 and the degree of opening of the variable-area orifice decreases, the fluid flow through the variable-area orifice decreases below the fluid flow through the fixed-area orifice 102A. The piston thus begins to move rightwardly biased by the spring 103. (This state is hereinafter referred to as "spontaneous equilibrium state".)

The control force (f-F) applied to the piston 102 during spontaneous equilibrium state is given by:

$$(P_a - P_b)A = f - F \tag{1}$$

where $P_a$ is the fluid pressure in the first fluid chamber, $P_b$ is the fluid pressure in the second fluid chamber, f is the biasing force of the spring 103, F is the biasing force of the electromagnet 104, and A is the sectional area of the piston 102.

As will be apparent from equation (1), the difference $P_a - P_b$ between the pressures at both ends of the fixed-area orifice 102A is determined solely by the forces f and F and the sectional area A. That is, the fluid pressures at the input port 101A and the output port 101B have no influence on the pressure difference $P_a - P_b$. The flow rate through the fixed-area orifice 102A is in turn proportional to the square root of the pressure difference. Thus, this flow control valve has the function of controlling the flow independently of the input fluid pressure and output fluid pressure (pressure compensation function).

But this flow control valve cannot prevent an extremely small amount of leakage of hydraulic fluid between the input port 101A and the output port 101B through the sliding surface of the piston 102 indicated by X in FIG. 8.

Thus, this valve is not suitable for use in applications where even an extremely small amount of leakage of hydraulic fluid is not permissible such as the use as a pressure reducing valve in an antilock brake system.

Unexamined Japanese patent publication 6-83457 discloses a flow control valve which is free of the problem of leakage of hydraulic oil while deactivated. As shown in FIG. 9, this valve 200 comprises a housing 211 having an input port 213 and an output port 216, and a piston 212 mounted in the housing 211 so as to be axially slidable in a substantially liquid-tight manner. A first fluid chamber A and a second fluid chamber B are defined between the end faces of the piston 212 and the housing 211. The second fluid chamber B communicates with the output port 216.

The piston 212 is formed with an axial fluid passage 212A including a fixed-area orifice 215 through which the first and second fluid chambers A and B communicate with each other. On its end facing the first fluid chamber A, the piston 212 is provided with a pushrod 212B for opening an on-off valve 214, which is described later. On the end facing the second fluid chamber B, the piston 212 is formed with a piston-driving protrusion 212C.

A spring 218 is mounted in the first fluid chamber A in a compressed state. It biases the piston 212 axially rightwardly to keep it in its initial position. An electromagnet 220 as a second biasing means is mounted in the second fluid chamber B of the housing 211. The piston-driving protrusion 212C is inserted in the electromagnet 220. When a current flows through the electromagnet 220, it biases the piston 212 axially leftwardly in the figure. While no current is flowing through the electromagnet 220, no biasing force is applied to the piston 212 from the electromagnet 220, so that the piston is kept in its initial position shown in FIG. 9 biased by the spring 218.

An on-off valve 214 is disposed between the first port 213 and the first fluid chamber A for opening and closing communication between the first port 213 and the first fluid chamber A. The on-off valve 214 is a puppet valve comprising a seating spring 214A, a spherical valve body 214B, and a valve seat 214C opposite one end of the piston 212 through the first fluid chamber A. Structurally, the puppet valve prevents leakage of fluid from the first port 213 to the second port 216.

Biased rightwardly by the seating spring 214A, the valve body 214B is normally pressed against the valve seat 214C, closing fluid communication between the first port 213 and the first fluid chamber A. When the piston 212 is moved leftwardly in this state, the valve body 214B is pushed leftwardly by the pushrod 212B against the force of the seating spring 214A. This opens fluid communication between the first port 213 and the first fluid chamber A. The flow control valve of this publication further includes a relief valve for bypassing the first and second fluid chambers A, B. But this valve is not described any further because it is not necessary for understanding of the present invention.

In this flow control valve, the piston 212 moves axially leftwardly to open the on-off valve 214 when the following relation (2) is met:

$$Pi \times \alpha < F - f + Pb \times A - Pa \times (A - \alpha) \quad (2)$$

where $\alpha$ is the effective sectional area of the sealing portion of the on-off valve 214, A is the sectional area of the piston 212, Pi is the fluid pressure at the first port 213, Pa is the fluid pressure in the first fluid chamber A, Pb is the fluid pressure in the second fluid chamber B and at the second port 216, f is the biasing force of the spring 218, and F is the biasing force of the electromagnet 220 (the biasing force of the seating spring 214A for keeping the valve body 214B seated is very small and thus ignored in the above formula).

Normally, the relation Pi>Pa≧Pb is met. Thus, while the electromagnet 220 is not energized, no force acts on the piston 212 that can overcome the force Pi×α, so that the fluid communication between the first port 213 and the second port 216 is completely shut off. When the valve 214 is opened by activating the electromagnet, the spontaneous equilibrium state of the piston begins as explained in relation to the flow control valve 100 shown in FIG. 8. But in the case of the flow control valve 200, in order to adjust the flow rate to a desired level, it is necessary to provide a pressure sensor for measuring Pi and Pb at the portions connecting the first port 213 and the second port 216, because the force Pi×α is acting in the valve 200.

For example, it is possible to provide the conventional flow control valve 100 with a pressure compensation function by forming in the piston a fixed-area orifice for restricting the fluid flow by use of the difference between the pressures at the input port and the output port and by making use of the spontaneous equilibrium state of the variable-area orifice provided on the outer periphery of the piston. But in this arrangement, it is impossible to prevent fluid leakage along the sliding surface of the piston.

In order to solve this problem, the flow control valve 200 is provided with a puppet valve to prevent leakage of fluid from the input port to the output port. But with this valve, it is necessary to provide a pressure sensor for detecting pressure difference at the input and output ports to feed back the detected pressure difference for the control of the electromagnetic valve in order to eliminate the influence of the fluid pressure at the input port on the puppet valve.

An object of the present invention is to provide a flow control valve which solves all these problems, and in which all the component parts including the fixed-area orifice, variable-area orifice and a puppet valve are provided in the housing.

SUMMARY OF THE INVENTION

According to the present invention, there is provided a flow control valve comprising a housing having a first port and a second port, a piston liquid-tightly and axially slidably mounted in the housing, a valve body formed at one end of the piston, a first fluid chamber defined between the other end of the piston and the housing, the first fluid chamber communicating with the first port through a fluid passage formed in the piston, an annular passage formed in the outer periphery of the piston, and a variable-area orifice adapted to close when the piston is at a predetermined axial position, thereby shutting off the communication between the first fluid chamber and the first port, a second fluid chamber defined between the valve body and the housing, a valve seat provided opposite the valve body for opening and closing the second fluid chamber, an on-off valve comprising the valve body and the valve seat for opening and closing the communication between the second port and the second fluid chamber as the piston moves axially, a passage extending from the first fluid chamber to the second fluid chamber through a fixed-area orifice and a connecting path formed in or separately from the piston, and a biasing means that axially biases the piston; the flow control valve being adapted such that a force acts on the piston in such a direction as to close the variable-area valve when there is a difference between the pressures in the first and second fluid chambers due to hydraulic fluid flowing through the fixed-area orifice, the flow control valve having a first position in which the on-off valve and the variable-area orifice are both closed, a second position in which the on-off valve is open and the variable-area orifice is closed, and a third position in which a desired flow rate is achievable with the on-off valve and the variable-area orifice both open.

Other features and objects of the present invention will become apparent from the following description made with reference to the accompanying drawings, in which:

DETAILED DESCRIPTION OF THE PREFERRED EMBODIMENT

Figure 6:
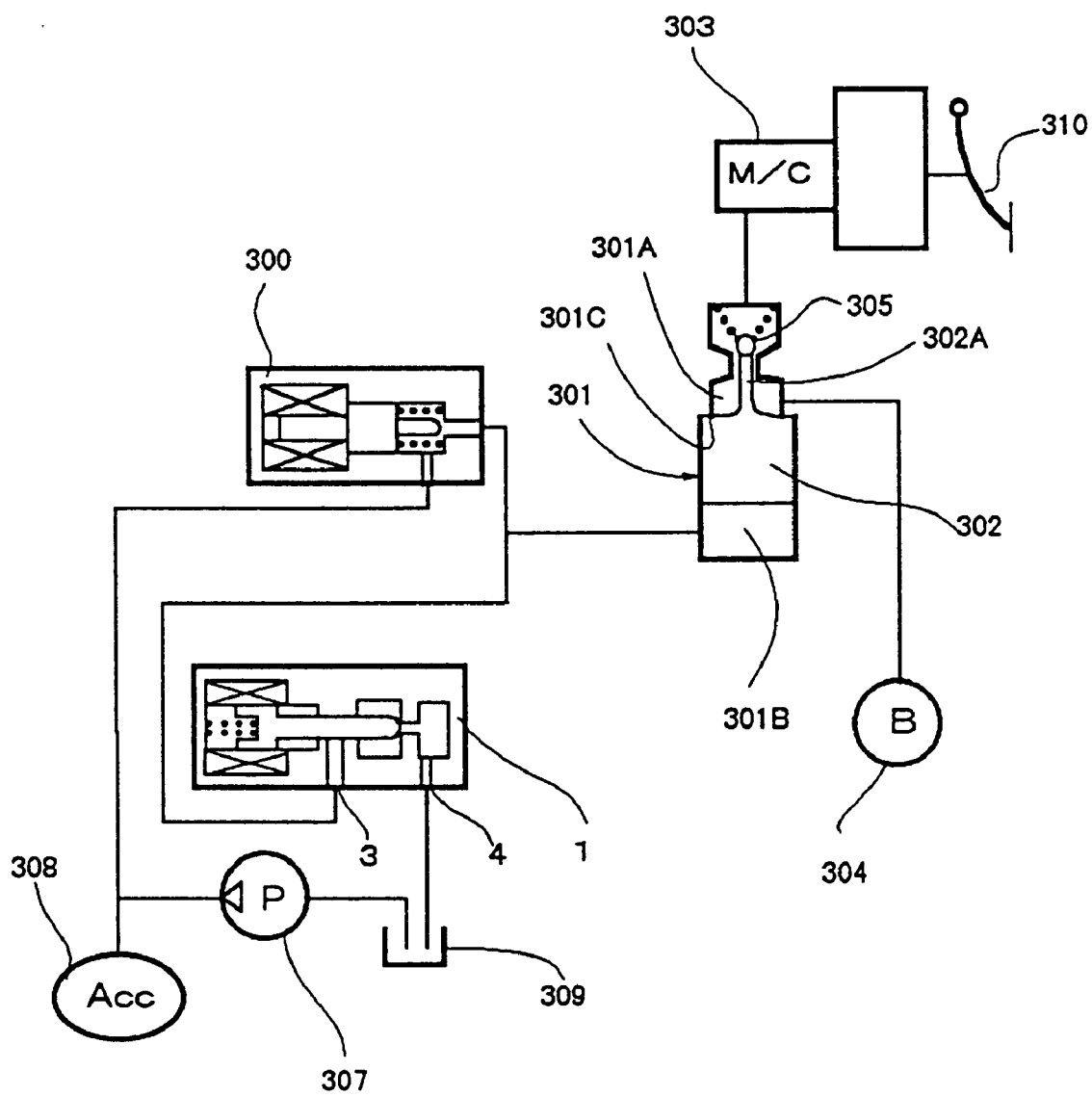
FIG. 6 is a schematic view of a well-known antilock brake system provided with the flow control valve according to the present invention.

While the present invention generally relates to flow control valves suited for use in onboard hydraulic devices for automobile steering systems, suspension systems, traction control systems and antilock brake systems, a pressure reducing valve for an antilock brake system as shown in FIG. 6 is described below by way of example.

FIG. 6 shows a well-known variable-volume antilock brake system which includes a well-known normally-open on-off electromagnetic valve 300 as a pressure increasing valve, and a flow control valve 1 according to the present invention as a pressure reducing valve. A deboost piston 302 is slidably mounted in a control chamber 301. The deboost piston 302 defines liquid-tightly separated first and second fluid chambers 301A and 301B.

In the first fluid chamber 301A, a shutoff valve 305 is provided for opening and shutting off fluid communication between the master cylinder 303 and a wheel brake 304. When the deboost piston 302 is in contact with an annular shoulder 301C provided in the control chamber 301, the shutoff valve 305 is opened by a pushrod 302A provided at one end of the deboost piston 302.

An accumulator 308 for accumulating high-pressure hydraulic fluid discharged from a pump 307 is connected to the second fluid chamber 301B through the normally open electromagnetic valve 300 which is a pressure increasing valve. The pressure reducing valve 1 connects the first port 3 to the second fluid chamber 301B, and the second port 4 to a reservoir 309. Hydraulic fluid in the reservoir 309 is pressurized by the pump 307 and accumulated in the accumulator 308.

In a normal state, in which the antilock brake system is off, high pressure accumulated in the accumulator 308 is introduced into the second fluid chamber 301B of the control chamber 301 through the pressure increasing normally open electromagnetic valve 300 to push up the deboost piston 302 into abutment with the annular shoulder 301C provided over (in the figure) the piston 302. In this state, the shutoff valve 305 is open and the pressure reducing flow control valve 1 is closed, so that hydraulic fluid is supplied from the master cylinder 303 to the wheel brake 304 corresponding to the degree of depression of the brake pedal 310.

Figure 8:
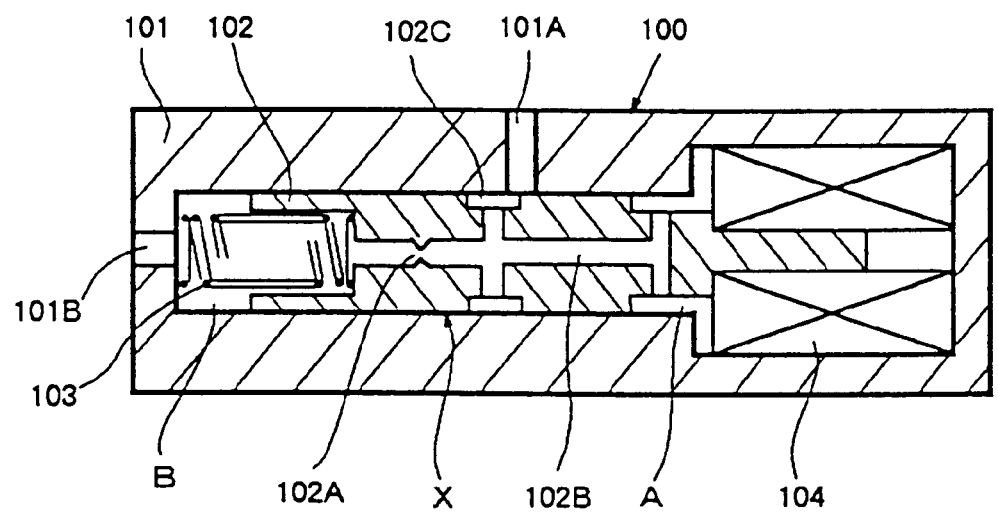
FIG. 8 is a sectional view of a prior art flow control valve.
Figure 9:
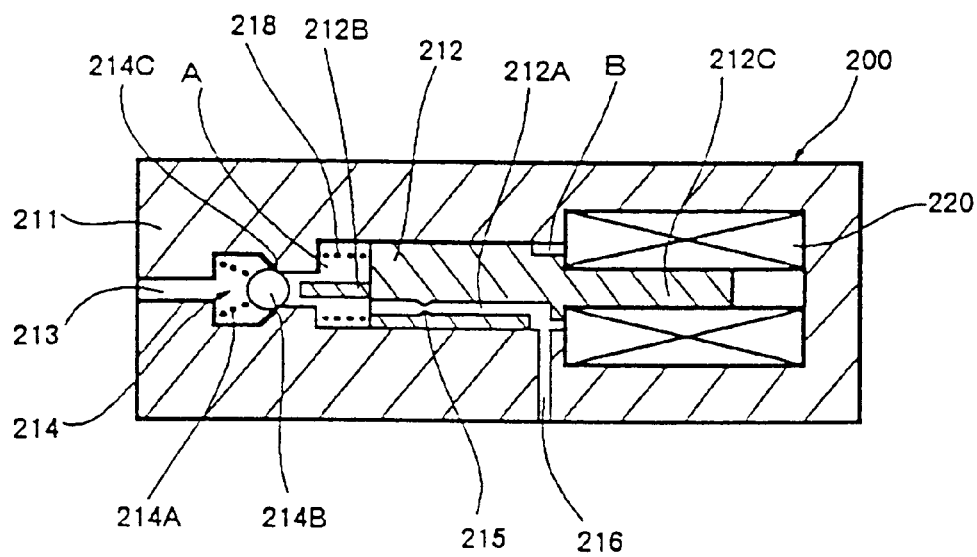
FIG. 9 is a sectional view of another prior art flow control valve.

Suppose that the conventional flow control valve 100 shown in FIG. 8 is used in this device instead of the flow control valve 1. Then, in the state shown in FIG. 6, hydraulic fluid will leak from the input port 101A connecting with the accumulator 308 to the output port 101B (and to the reservoir 309) through the gap between the sliding surfaces of the piston 102 and the housing 101. This makes it necessary to drive the pump 307 to feed the hydraulic fluid in the reservoir 309 back into the second fluid chamber 301B of the control chamber 301. In an extreme case, the pressure in the second fluid chamber 301B may drop to such a degree that the shutoff valve 305 is closed by the hydraulic fluid pressure in the master cylinder 303. If this happens, braking function will be lost.

During antilock braking control, if an electronic control unit (not shown) detects that the vehicle wheel carrying the brake 304 is about to lock up, the ECU closes the normally open electromagnetic valve 300 and activates the flow control valve 1 to discharge hydraulic pressure fluid in the second fluid chamber 301B of the control chamber 301 into the reservoir 309 and thereby to move the deboost piston 302 downward in the figure, thus closing the shutoff valve 305. As the deboost piston 302 moves down further, the volume of the first fluid chamber 301A increases. This reduces the fluid pressure in the wheel brake 304, preventing lockup of the wheel.

Now referring to the attached drawings, the flow control valve according to the present invention as used in the antilock brake system device shown in FIG. 6 will be described.

Figure 1:
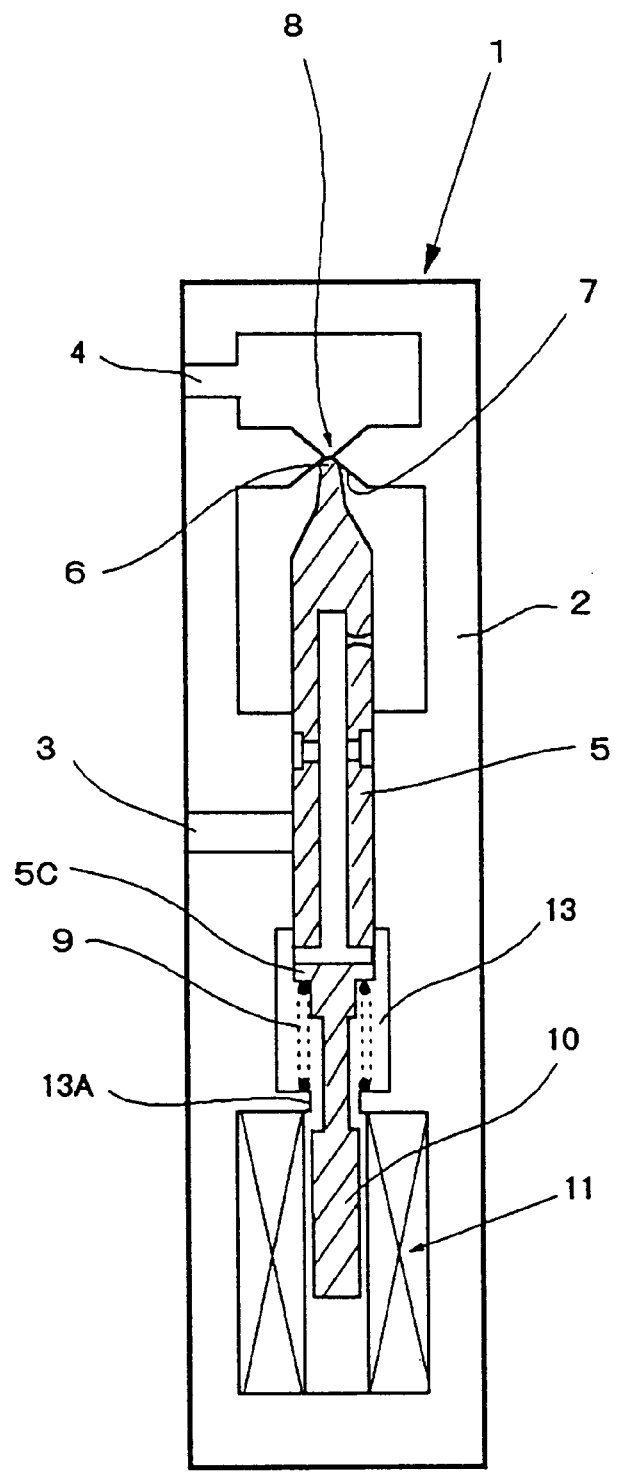
FIG. 1 is a schematic view of a flow control valve according to the present invention in the first position.

FIG. 1 is a schematic view of the flow control valve 1 according to the present invention when it is in its first position. The housing 2 has a first port 3 and a second port 4. When this valve is used in the antilock brake system of FIG. 6, the first port 3 is connected to the second fluid chamber 301B, while the second port 4 is connected to the reservoir 309. A piston 5 is axially slidably mounted in the housing 2. The valve 1 further includes an on-off valve means 8 comprising a valve seat 7 integral with the housing 2 and a valve body 6 formed at one end of the piston 5 and having a spherical head adapted to be pressed against the seat 7. At the other end, the piston 5 has a driving member 10 for driving an electromagnet 11. A spring 9 is mounted in a compressed state between a shoulder 5C of the piston 5 and a gate 13A of the first fluid chamber 13 to urge the piston 5 in such a direction as to close the on-off valve 8.

The electromagnet 11 is liquid-tightly fitted in the housing 2 around the driving member 10. During antilock control, when the electronic control unit (not shown) detects that the wheel is about to lock up, the ECU drives the electromagnet 11 to open the on-off valve 8. When the valve 1 is in the first position shown in FIG. 1, in which electromagnet 11 is producing no attracting force F, the on-off valve 8 prevents, theoretically, fluid leakage toward the second port 4.

Figure 2:
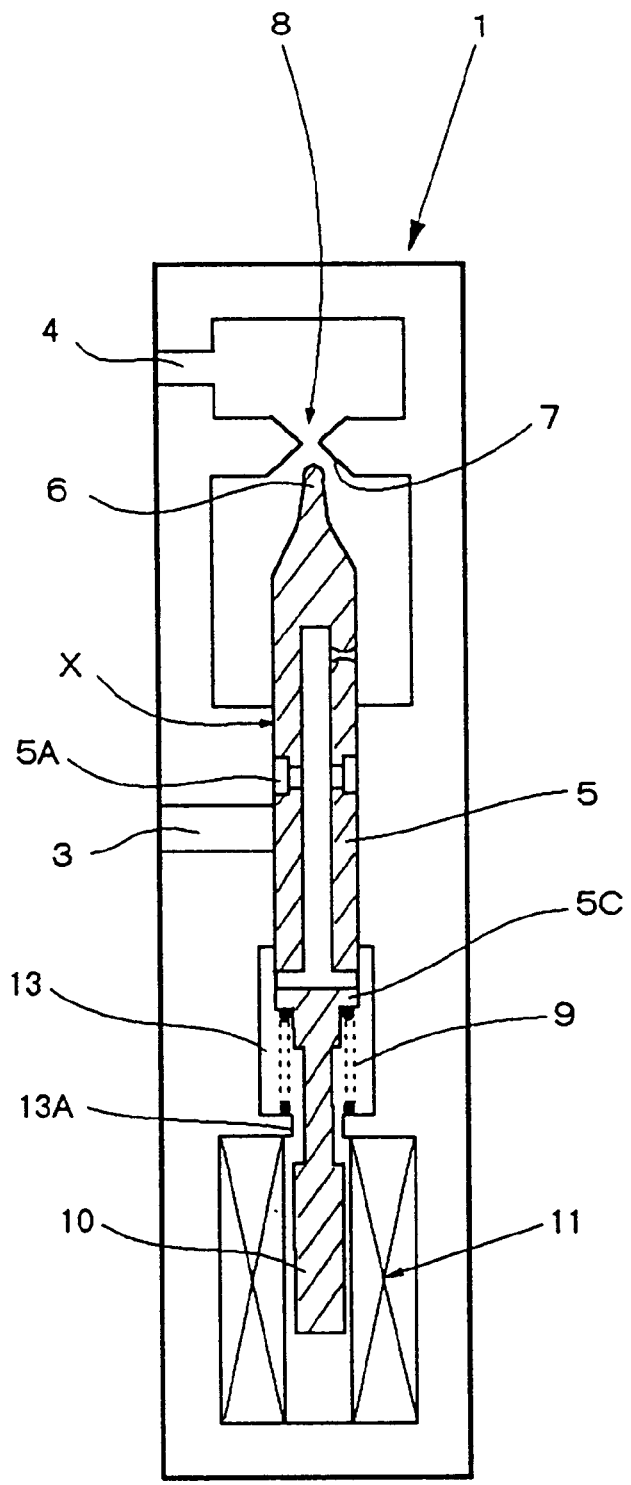
FIG. 2 is a schematic view of the same in the second position.

FIG. 2 is a schematic view of the fluid flow control valve 1 of the invention when it is in a second position. When a current applied to the electromagnet 11 exceeds a predetermined value, the attraction force of the electromagnet 11 exceeds the biasing force of the spring 9. The driving member 10 is thus moved downward in the figure. In this state, although the on-off valve 8 is open, no variable-area orifice is formed, that is, fluid communication between the annular groove 5A formed in the outer periphery of the piston and the first port 3 is closed. In this state, in which the fluid pressure in the second port 4 is zero because the port 4 communicates with the reservoir 309, the attraction force F of the electromagnet 11 satisfies the following relation:

$$F \geq \alpha \times Pa + f \tag{3}$$

where f is the biasing force of the spring 9, α is the effective sectional area of the valve body 6, Pa is the fluid pressure at the first port 3.

Although the sliding surfaces X of the housing 2 and the piston 5 are in close contact with each other, it is impossible to perfectly prevent fluid leakage therebetween.

Figure 3:
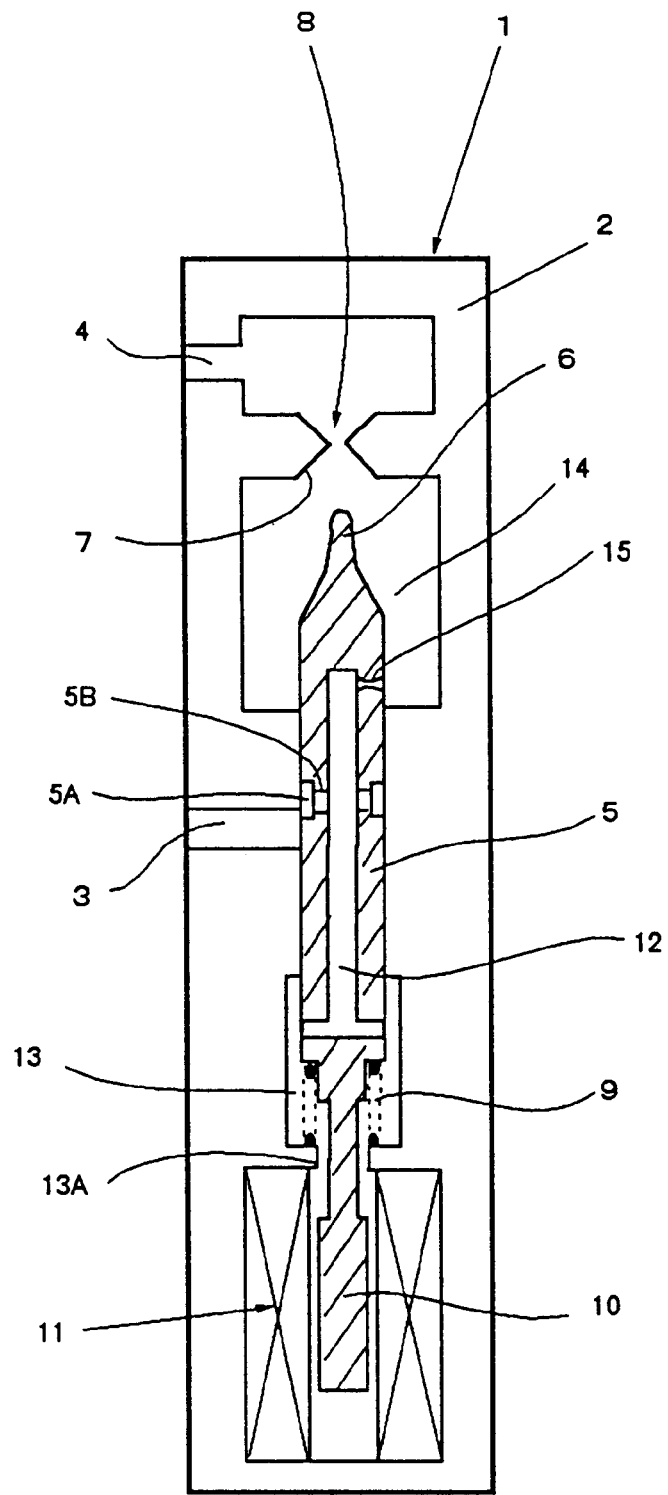
FIG. 3 is a schematic view of the same in the third position.

FIG. 3 is a schematic view of the flow control valve 1 according to the present invention when it is in a third position. In this state, the annular groove 5A communicates with the fluid passage 12 formed in the piston 5 through cross holes 5B. The piston 5 is formed with a fixed-area orifice 15 which communicates both with a first fluid chamber 13, that is, a space in the housing 2 surrounding the driving member 10 and a second fluid chamber 14, that is, or a space in the housing 2 surrounding the valve body 6.

Formed at the intersection of the first port 3 and the annular groove 5A is a variable-area orifice which is variable in fluid passage area (or degree of opening) depending on the relative position produced between the port 3 and the groove 5A. As with the conventional flow control valve 100 shown in FIG. 8, the variable-area orifice is subjected to spontaneous equilibrium effect. Fluid flows toward the second port 4 at a rate proportional to the square root of the difference between the pressures in the first and second fluid chambers 13 and 14 due to the interposition of the fixed-area orifice 15. Thus, this valve has the same pressure compensation function (represented by equation (1)) as the conventional flow control valve 100 has. That is, fluid flow is controllable irrespective of fluid pressures at the first port 3 and the second port 4.

Figure 4:
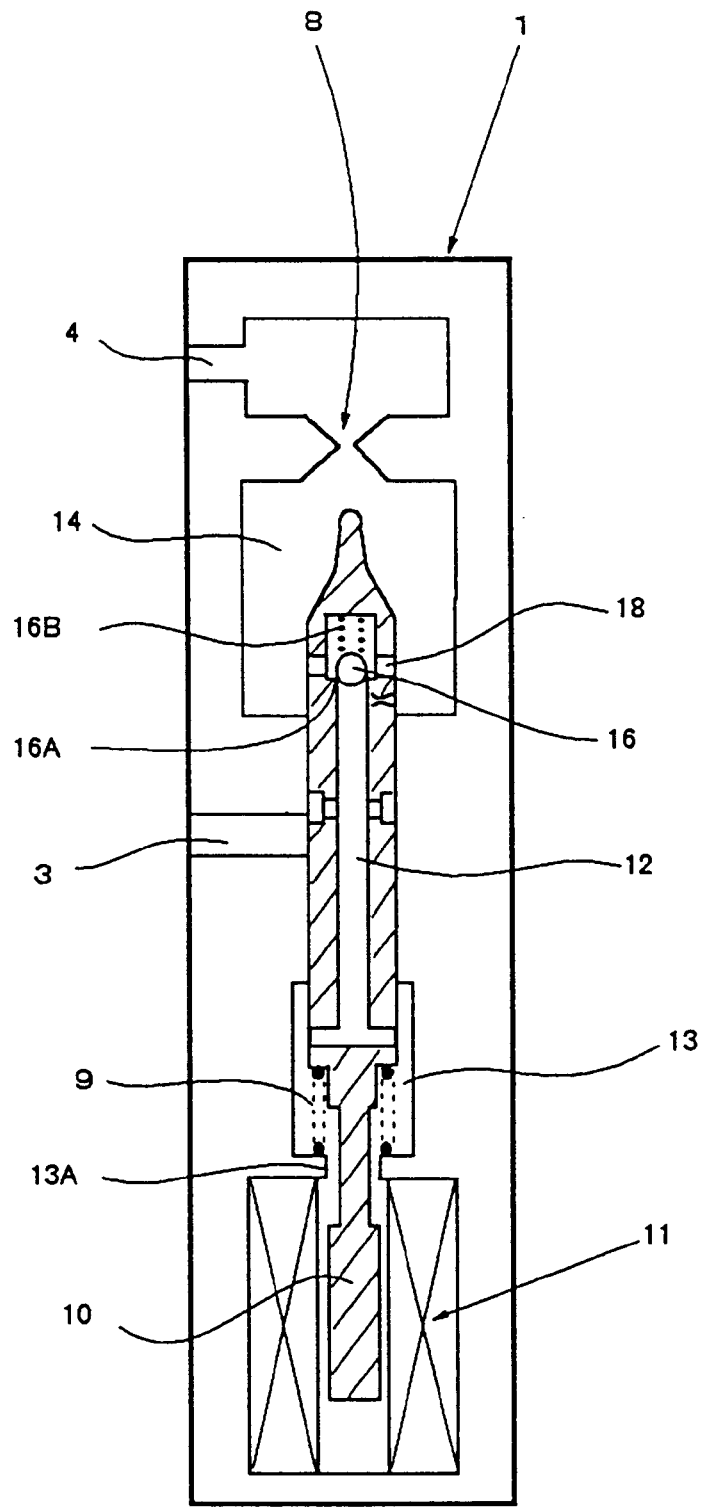
FIG. 4 is a schematic view of a flow control valve according to the present invention provided with a relief valve.

FIG. 4 is a schematic view of a flow control valve 1 according to the present invention. This valve has a relief valve 16 adapted to be urged against a seat 16A formed at the end of the fluid passage 12 by a relief spring 16B. The relief valve 16 opens when the difference between the pressures in the first fluid chamber 13 and the second fluid chamber 14 exceeds a predetermined value. When the valve 16 opens, hydraulic fluid flows at a high rate through a bypass 18 toward the second port 4. This relief function is effective when it is necessary to reduce brake pressure more quickly than when the valve is in the third position.

Figure 5:
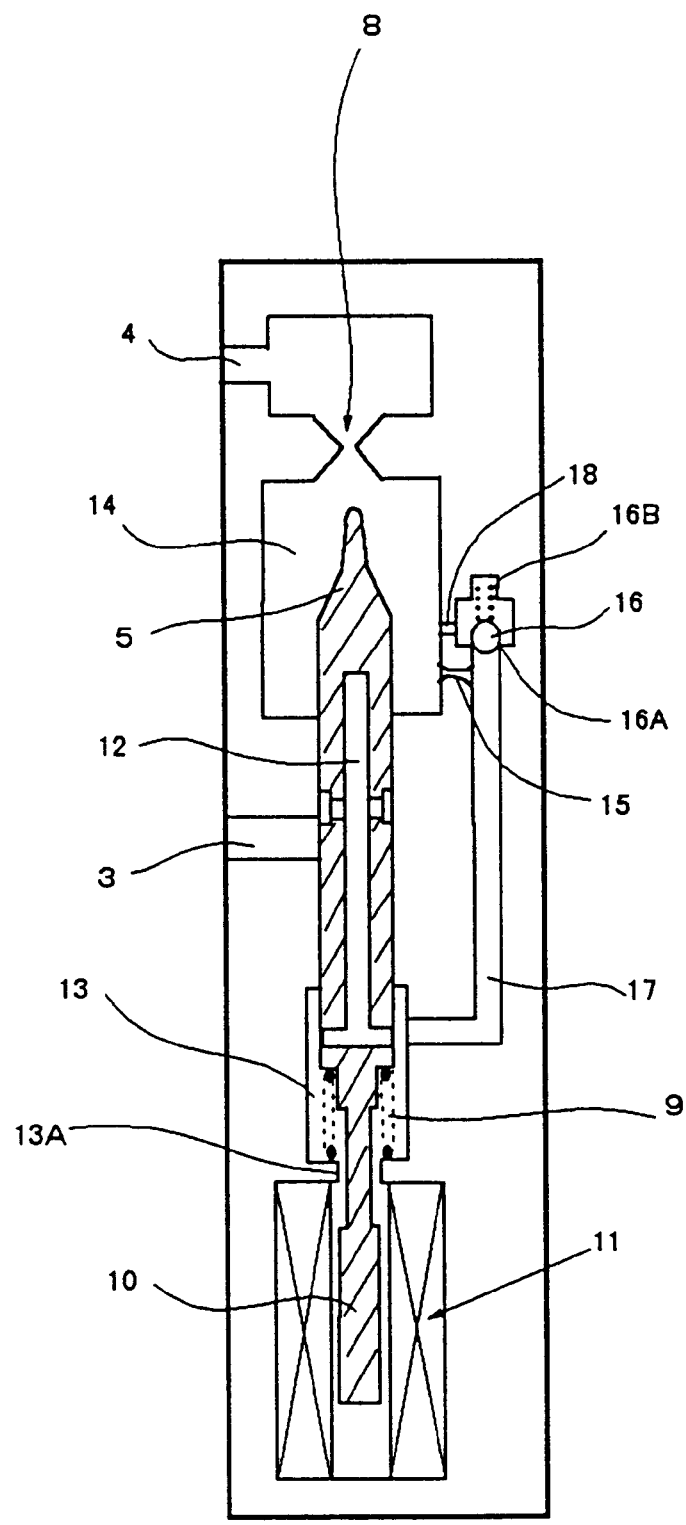
FIG. 5 is a schematic view of a flow control valve according to the present invention provided with a fixed-area orifice and a relief valve.

FIG. 5 shows another embodiment, in which the valve has both the fixed-area orifice 15 and the relief valve 16.

The fixed-area orifice 15 may be provided in the fluid passage 12 formed in the piston 5 and connecting the first fluid chamber 13 to the second fluid chamber 14, as shown in FIGS. 1–4, or in a passage 17 formed in (or outside) the housing 2 and connecting with the second fluid chamber 14, as shown in FIG. 5.

The relief valve 16 may be provided such that it can shut off a bypass 18 extending between the first and second fluid chambers 13 and 14 as shown in FIG. 4, or so that it can shut off a bypass 18 extending from a line 17 to the second fluid chamber 14 as shown in FIG. 5.

Now the operation of the flow control valve 1 according to the present invention is described when it is used in the antilock brake system shown in FIG. 6 with reference to the brake fluid pressure variation pattern during antilock brake control.

Figure 7:
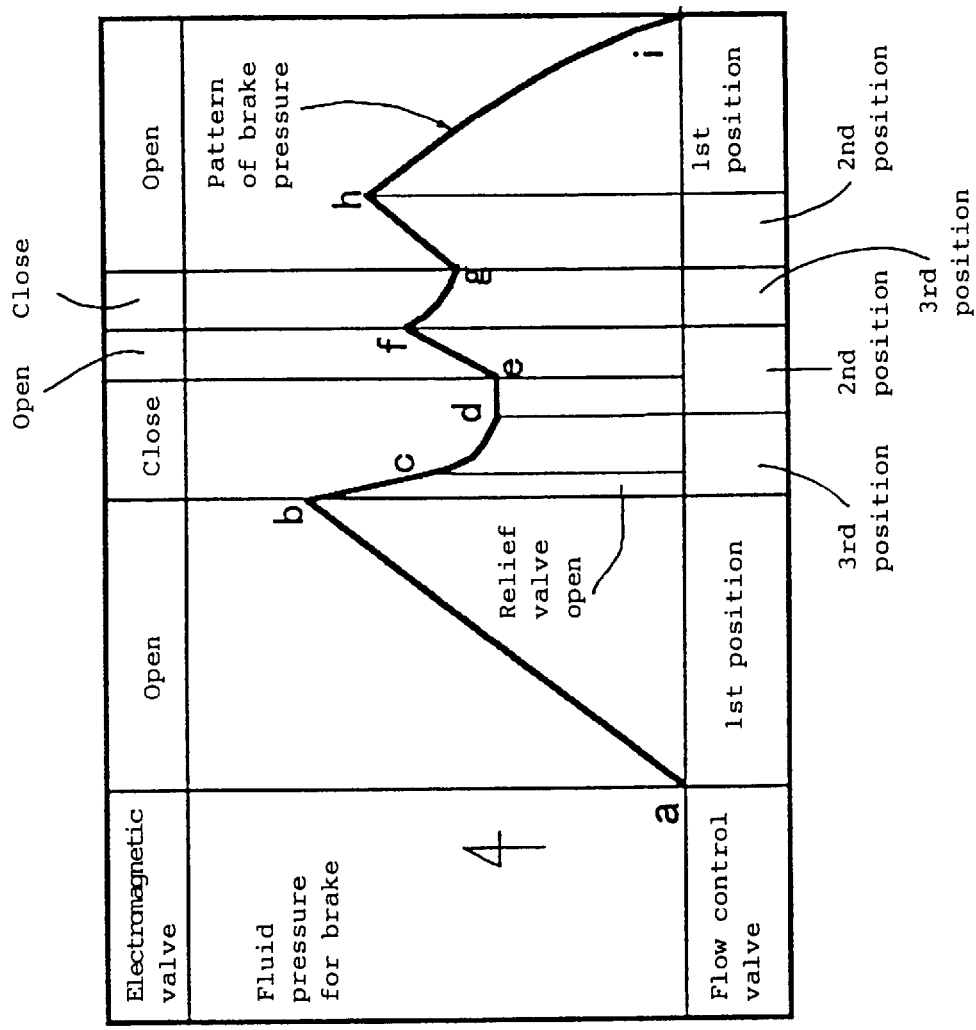
FIG. 7 is a virtual variation pattern of brake fluid pressure during antilock brake control.

FIG. 7 shows a virtual variation pattern of the brake fluid pressure during antilock brake control. Between a) and b), hydraulic fluid is supplied to the wheel brake 304 through the first fluid chamber 301A of the control chamber 301 in proportion to the amount of depression of the brake pedal 310. In this zone, the electromagnetic valve 300 is open, so that high pressure accumulated in the accumulator 308 is applied to the second fluid chamber 301B. On the other hand, the flow control valve 1 is in the first position, stopping fluid flow from the second fluid chamber 301B into the reservoir 309.

At b), the electronic control unit (not shown) detects that the wheel is about to lock up and closes the electromagnetic valve 300 while changing the position of the valve 1 from position 1 to 3. Thus, in the zone between b) and c), hydraulic fluid in the second fluid chamber 301B is discharged into the reservoir 309, and the volume of the first fluid chamber 301A increases because the shutoff valve 305 is closed. Immediately after the valve position changes to the third position, the difference between the pressures in the first and second fluid chambers 13 and 14 exceeds the predetermined value. This opens the relief valve 16, so that hydraulic fluid is discharged at a high rate into the reservoir 309. Fluid pressure in the wheel brake 304 thus drops quickly on the point c).

Between c) and d), due to spontaneous equilibrium action of the variable-area orifice, hydraulic fluid is discharged into the reservoir 309 through the second port 4 at a rate proportional to the square root of the difference between the pressures in the first and second fluid chambers 13 and 14 due to the presence of the fixed-area orifice 15 between the chambers 13 and 14. At point d), the electronic control unit detects that the wheel is recovering from locking tendency, and changes the position of the valve 1 to the second position to stop fluid discharge through the second port 4 into the reservoir 309. Fluid pressure in the wheel brake 304 is thus maintained constant. Between d) and e), the ABS is standing by so that it can instantly start reducing brake pressure upon detection of a wheel lockup sign.

At point e), the electronic control unit determines that the wheel tire has completely recovered its grip, and opens the electromagnetic valve 300 while keeping the valve 1 in the second position. As a result, in the zone between e) and f), high pressure is introduced into the second fluid chamber 301B. Thus, the volume of the first fluid chamber 301A continuously decreases and thus the fluid pressure in the wheel brake continuously increases until the shutoff valve 305 is opened by the pushrod 302A.

At f), the ECU reduces brake fluid in the same manner as in the zone between c) and d). Between g) and h), the ECU intermittently increase brake pressure in the same manner as in the zone between e) and f). Ordinarily, the driver keeps depressing the brake pedal 310 until the vehicle comes to a complete stop. Between h) and i), the driver lets the brake pedal 310 gradually return.

By using the flow control valve 1 of the present invention as the pressure reducing valve of FIG. 6, pressure reducing control can be carried out finely as shown in FIG. 7. By using the conventional normally open flow control valve 100 disclosed in unexamined Japanese patent publication 3-90462 as the pressure increasing valve, pressure increase control can also be carried out finely.

In the flow control valve according to the present invention, a pressure difference is produced between the ends of the fixed-area orifice formed in the slide piston every time the brake pressure is increased or reduced and this pressure difference balances with the output of the electromagnetic biasing means. Thus, the flow rate is automatically adjusted so as to correspond to the electric command. This eliminates the influence of the input and output fluid pressures on the rising and lowering speeds of fluid pressure.

When the on-off valve for opening and closing fluid communication between the first (input) port and the second (output) port is closed, leakage of fluid stops completely. This increases the reliability of control.

The valve can be set in any of the first position in which the piston is in the initial position with no electromagnetic force acting thereon and thus fluid flow is zero, the second position in which the output fluid pressure is maintained irrespective of the input fluid pressure, and the third position in which the output fluid pressure is controlled according to the spontaneous equilibrium state of the variable-area orifice. The relief valve for shutting off the bypass makes it possible to feed hydraulic fluid at a high rate without being restricted by the fixed-area orifice. This makes possible simple, highly responsive, fine flow control in a desired pattern.

What is claimed is:

1. A flow control valve comprising a housing having a first port and a second port, a piston liquid-tightly and axially slidably mounted in said housing, a valve body formed at one end of said piston, a first fluid chamber defined between the other end of said piston and said housing, said first fluid chamber communicating with said first port through a fluid passage formed in said piston, an annular passage formed in the outer periphery of said piston, and a variable-area orifice configure to close when said piston is at a predetermined axial position, thereby shutting off the communication between said first fluid chamber and said first port, a second fluid chamber defined between said valve body and said housing, a valve seat provided opposite said valve body for opening and closing said second fluid chamber, an on-off valve comprising said valve body and said valve seat for opening and closing the communication between said second port and said second fluid chamber as said piston moves axially, a passage extending from said first fluid chamber to said second fluid chamber through a fixed-area orifice and a connecting path formed in or separately from said piston, and a biasing means that axially biases said piston;

said flow control valve being configured such that a force acts on said piston in such a direction as to close said variable-area orifice when there is a difference between the pressures in said first and second fluid chambers due to hydraulic fluid flowing through said fixed-area orifice, said flow control valve having a first position in which said on-off valve and said variable-area orifice are both closed, a second position in which said on-off valve is open and said variable-area orifice is closed, and a third position in which a desired flow rate is achievable with said on-off valve and said variable-area orifice both open.

2. A flow control valve as claimed in claim 1 further comprising a bypass extending from said first fluid chamber to said second fluid chamber in parallel to said fluid passage or said connecting path, and a relief valve provided in said bypass and adapted to open when the difference between the pressures in said first and second fluid chambers exceeds a predetermined value.

3. A flow control valve as claimed in claim 1 wherein said biasing means comprises a spring biasing said on-off valve in such a direction as to close said on-off valve, and an electromagnetic biasing means for biasing said on-off valve in a such direction as to open said on-off valve.

* * * * *

UNITED STATES PATENT AND TRADEMARK OFFICE
CERTIFICATE OF CORRECTION

PATENT NO. : 5,904,335
DATED : May 18, 1999
INVENTOR(S) : H. OYAMA

It is certified that error appears in the above-identified patent and that said Letters Patent is hereby corrected as shown below:

On the cover of the printed patent, at item [75], Inventor, change "Itami" to ---Hyogo---.

On the cover of the printed patent, at item [56], References Cited, Foreign Patent Documents, change "32235787" to ---3223578---.

At column 9, line 5 (claim 1, line 9) of the printed patent, "configure" should be ---configured---.

Signed and Sealed this

Twenty-third Day of May, 2000

Attest:

Q. TODD DICKINSON

*Attesting Officer*          *Director of Patents and Trademarks*